United States Patent
Luck, Jr. et al.

(10) Patent No.: US 8,223,926 B2
(45) Date of Patent: Jul. 17, 2012

(54) RESILIENT REGISTRATION WITH A CALL MANAGER

(75) Inventors: Carleton M. Luck, Jr., Apex, NC (US);
Louis L. Pratt, Holly Springs, NC (US);
Craig P. Miller, Raleigh, NC (US);
Roger V. Beathard, McKinney, TX (US)

(73) Assignee: Cisco Technology, Inc., San Jose, CA (US)

( * ) Notice: Subject to any disclaimer, the term of this patent is extended or adjusted under 35 U.S.C. 154(b) by 942 days.

(21) Appl. No.: 11/057,288

(22) Filed: Feb. 11, 2005

(65) Prior Publication Data

US 2006/0182255 A1    Aug. 17, 2006

(51) Int. Cl.
*H04M 3/08* (2006.01)

(52) U.S. Cl. .............. 379/9.05; 379/112.02; 379/221.04; 379/221.03; 379/221.01; 370/216; 370/217; 370/219; 370/220; 370/221; 714/2; 714/4.11

(58) Field of Classification Search ............... 714/9, 2, 714/4.11; 370/237, 352, 217, 219, 220, 216, 370/221; 379/215, 9.05, 221.01, 221.03, 379/221.04, 112.02; 709/227–228, 245, 709/249; 455/426.2, 423
See application file for complete search history.

(56) References Cited

U.S. PATENT DOCUMENTS

| | | | |
|---|---|---|---|
| 5,105,420 A | 4/1992 | Ardon et al. | 370/16 |
| 5,706,276 A | 1/1998 | Arslan et al. | 370/216 |
| 6,122,753 A | 9/2000 | Masuo et al. | 714/4 |
| 6,226,260 B1 | 5/2001 | McDysan | 370/216 |
| 6,282,194 B1 | 8/2001 | Cheesman et al. | 370/356 |
| 6,522,732 B1 | 2/2003 | Pullen et al. | 379/112.02 |
| 6,570,855 B1* | 5/2003 | Kung et al. | 370/237 |
| 6,597,687 B1 | 7/2003 | Rao | 370/352 |
| 6,671,883 B1 | 12/2003 | Rahman | 725/123 |
| 6,704,278 B1 | 3/2004 | Albert et al. | 370/216 |
| 6,724,756 B2 | 4/2004 | Fourie et al. | 370/360 |
| 6,795,933 B2 | 9/2004 | Wachel | 714/4 |
| 2003/0167343 A1* | 9/2003 | Furuno | 709/244 |
| 2004/0037219 A1 | 2/2004 | Shaffer et al. | 370/217 |
| 2004/0120251 A1* | 6/2004 | Shanley et al. | 370/225 |
| 2004/0190442 A1* | 9/2004 | Lee | 370/217 |
| 2004/0193951 A1 | 9/2004 | Shaffer et al. | 714/9 |
| 2005/0265327 A1* | 12/2005 | Buch et al. | 370/389 |

FOREIGN PATENT DOCUMENTS

WO    2004/019599    3/2004

OTHER PUBLICATIONS

Notification of Transmittal of the International Search Report and the Written Opinion of the International Searching Authority, or the Declaration, International Application No. PCT/US06/03818, 8 pages, Mailed Sep. 4, 2007.

(Continued)

*Primary Examiner* — Antim Shah
(74) *Attorney, Agent, or Firm* — Baker Botts L.L.P.

(57) ABSTRACT

Registering with a call manager includes connecting to a first call manager and a second call manager. The endpoints register with the first call manager and send keep-alive signals to the first call manager and the second call manager. If a failure is detected in the first call manager, the system initiates a failover process. The endpoints re-register with the first call manager when the first call manager regains operability.

36 Claims, 7 Drawing Sheets

OTHER PUBLICATIONS

State Intellectual Property Office of the People's Republic of China, The First Office Action, Filing No. 20068001655, 16 pages, Jan. 22, 2010.

State Intellectual Property Office of the People's Republic of China, The Second Office Action, Application No. 200680001655.4, Chinese Office Action—22 pages, Translation of the Chinese Office Action—8 pages, transmitted to Baker Botts by Foreign Associate on Sep. 16, 2011.

Communication from European Patent Office dated Feb. 8, 2012 with enclosed Supplementary European Search Report for Application No. 06734276.6-2414/ 1847110 PCT/US2006003818, 5 pages, Feb. 8, 2012.

* cited by examiner

RESILIENT REGISTRATION WITH A CALL MANAGER

TECHNICAL FIELD

This invention relates generally to the field of communications and more specifically to a system and method for registering with a call manager.

BACKGROUND

Session Initiation Protocol (SIP) is a protocol for Internet conferencing, telephony, presence, events notification, and instant messaging. When placing a call using SIP, Domain Name Servers provide a list of proxies to the phones and facilitate communication between SIP phones. Using the Domain Name Servers, the phone detects the unavailability of the proxy when a user tries to use the phone. Therefore, a phone can be unavailable for a period of time without the user realizing the unavailability. Detecting an outage may take considerable time and increase the amount of time the phone is unavailable. Furthermore, when the phone attempts to connect to a back up proxy because the original proxy has failed, the process takes additional time using the Domain Name Servers.

SUMMARY OF THE DISCLOSURE

In accordance with the present invention, disadvantages and problems associated with previous techniques for call management may be reduced or eliminated.

According to one embodiment of the present invention, registering with a call manager includes connecting to a first call manager and a second call manager. The endpoints register with the first call manager and send keep-alive signals to the first call manager and the second call manager. If a failure is detected in the first call manager, the system initiates a failover process. The endpoints re-register with the first call manager when the first call manager regains operability.

In another embodiment of the invention, registering with a call manager includes a plurality of call managers that register a plurality of endpoints and manage a call session associated with the plurality of endpoints. Additionally, the plurality of endpoints couple to the plurality of call managers and register with a first call manager. The plurality of endpoints maintain a connection with the first call manager and a second call manager and send keep-alive signals to the first and second call managers. One or more transfer protocol servers couple to the plurality of endpoints and provide the plurality of endpoints with configuration information.

Certain embodiments of the invention may provide one or more technical advantages. A technical advantage of one embodiment may include a call manager having high availability and a user having an improved probability of continual phone service. The embodiment facilitates quick recovery during failure while minimizing resource impacts. Another technical advantage of one embodiment may include using a call manager in a SIP environment, which provides the ability to have call preservation if a call session fails. Yet another advantage includes using call managers that provide the function of multiple call control, lower service delay, lower call delay, and lower setup delay if a failure occurs during the call session.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, like numerals being used for like and corresponding parts of the various drawings in which.

DETAILED DESCRIPTION OF THE DRAWINGS

Figure 1:
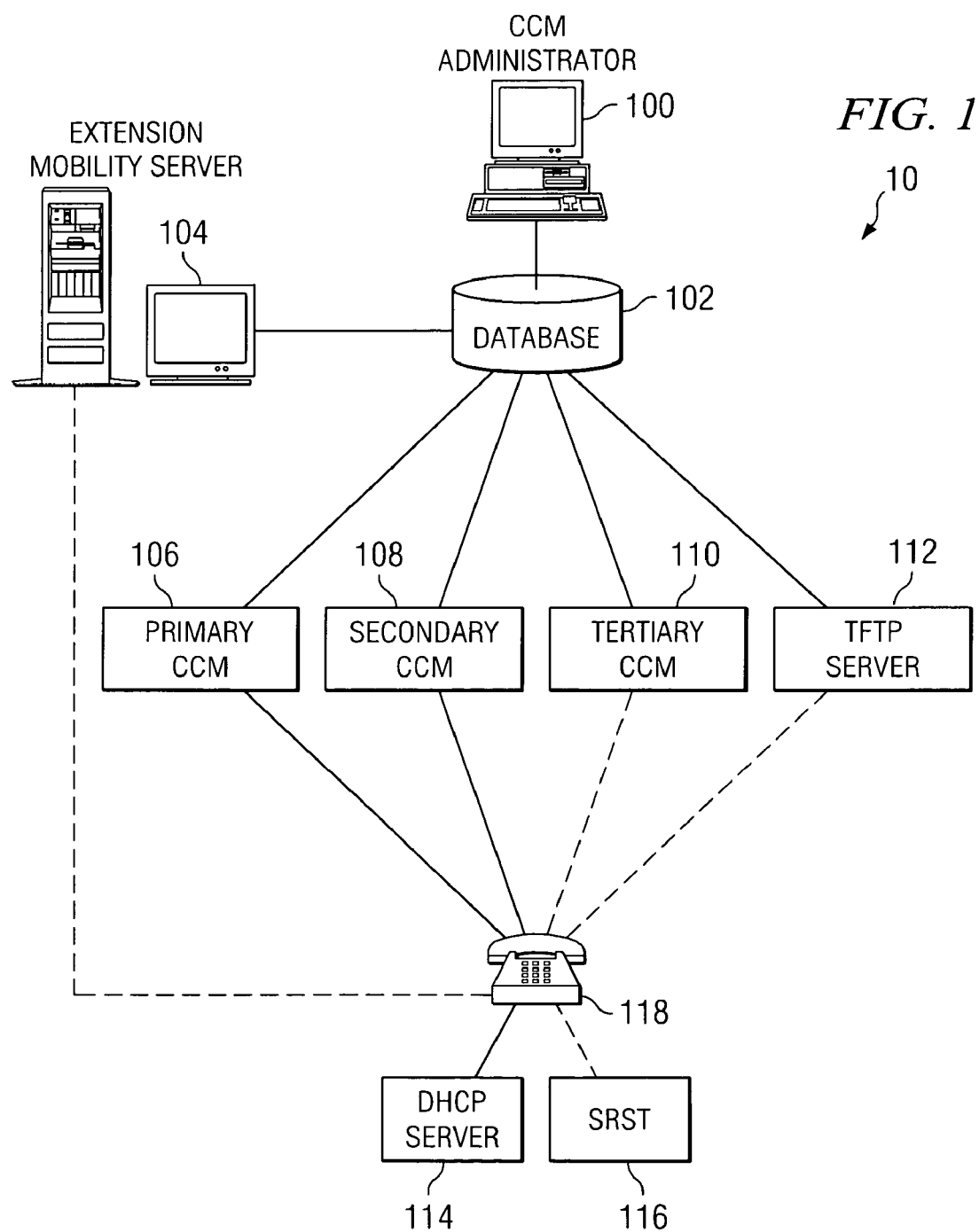
FIG. 1 is a block diagram illustrating one embodiment of a system capable of registering with a call manager.

FIG. 1 illustrates a system 10 that is capable of providing resilient registration with a call manager. In general, system 10 includes an endpoint 118, a plurality of call managers, and a transfer protocol server that combine to provide resilient registration for endpoint 118. System 10 is compatible with any suitable protocol including Session Initiation Protocol (SIP) and Skinny Call Control Protocol (SCCP).

Endpoint 118 may be any combination of hardware and/or software that provides communication services to a user. Endpoint 118 may include one or a combination of the following: a user interface to accommodate user interaction, a network interface to provide for a network connection, a memory to store, and a processor to process and manipulate data. Endpoint 118 may include digital, or Internet Protocol (IP) telephones, personal computers, or any other suitable device. System 10 contemplates any number and arrangement of endpoints 118. In various embodiments, endpoint 118 supports Transmission Control Protocol (TCP), Transport Layer Security (TLS), and User Datagram Protocol (UDP). Endpoint 118 exchanges audio, voice, data, video, or other information in a communication session in system 10 and may include multiple lines to participate in communication sessions.

Dynamic Host Configuration Protocol (DHCP) server 114 automatically assigns endpoint 118 an IP address. DHCP server 114 provides other configuration information to endpoint 118 including transfer protocol server and gateway information.

Primary call manager 106, secondary call manager 108, and tertiary call manager 110 (referred to collectively as call managers 106, 108, 110) manage the call sessions of endpoint 118. Call managers 106, 108, 110 are applications that include such capabilities as controlling call processing, routing, telephone features and options (such as call hold, call transfer, and caller identification), device configuration, and other telephony functions and parameters within system 10. Call managers 106, 108, 110 include logic to handle configuration, registration, call processing, and other management functions of endpoint 118. Call managers 106, 108, 110 may also control endpoints 118 located elsewhere in system 10. In an embodiment, a network may connect call managers 106, 108, 110 to endpoints 118. Call managers 106, 108, 110 may be implemented as software executing on one or more computers coupled to system 10. The software of call managers 106, 108, 110 may be embodied in any type of computer-readable medium, including, but not limited to, hard drives, diskettes, CD-ROMs, DVD-ROMs, or other optical or magnetic storage devices.

Survivable Remote Site Telephony (SRST) router 116 provides telephony services to endpoint 118 in system 10 if a network outage occurs. SRST router 116 also may become active if call managers 106, 108, 110 fail. SRST router 116 includes any combination of hardware and/or software that allows calls between endpoints 118 to communicate with each other, allows calls from a Public Switched Telephone Network (PSTN) to communicate with endpoint 118, and allows calls from endpoint 118 to communicate with off-site endpoint 118 through the PSTN. SRST router 116 may accept registrations from endpoint 118 and route calls.

In the illustrated embodiment, Trivial File Transfer Protocol (TFTP) server 112 provides endpoint 118 with configuration information when endpoint 118 boots up, upon endpoint 118 being reset, or any other suitable occurrence. Any suitable transfer protocol server, such as a Hyper Text Transfer Protocol server, may provide endpoint 118 with configuration information. The configuration information may include information regarding call managers 106, 108, 110, or SRST router 116. Additionally, the configuration information may include a media access control (MAC) address. The MAC address is a unique, physical address associated with each endpoint 118 at a network interface. In one embodiment, system 10 includes a plurality of TFTP servers 112. DHCP server 114 provides endpoint 118 with an address of one of the plurality of TFTP servers 112 and endpoint 118 downloads configuration files from that TFTP server 112. In another embodiment, multiple TFTP servers 112 may be on a network, enabled on the same server as a call manager, or on a different network. TFTP server 112 may be any server, including any suitable combination or arrangement of logic operable to provide endpoint 118 with configuration information.

Call manager administrator 100 provides or changes information to system 10, specifically database 102. Call manager administrator 100 may provide database 102 with configuration information for endpoint 118. Database 102 includes any database operable to contain information about system 10, endpoint 118 or any module in system 10. The information in database 102 may include configuration information for endpoint 118.

Extension mobility server (EMS) 104 allows users to temporarily access a specific endpoint 118, such as services, speed dials, and link appearances, from another endpoint 118. A user accesses EMS 104 by accessing an interface of endpoint 118. EMS 104 interacts with database 102 to apply new configuration information to endpoint 118. TFTP server 112 dynamically generates the configuration file and endpoint 118 re-reads the new configuration file from TFTP server 112 upon being reset.

In operation, endpoint 118 registers with primary call manager 106. Registration informs primary call manager 106 that endpoint 118 is ready for operation, associates endpoint 118 with primary call manager 106, and activates the lines that are configured on endpoint 118. The directory numbers for the configured lines on endpoint 118 are activated within primary call manager 106 so calls can terminate to endpoint 118.

Registering with a call manager includes the following steps: querying DHCP server 114 to get module information, locating TFTP server 112, downloading the configuration files from TFTP server 112, determining what protocol to use, connecting to a first and second call manager, and sending a register message to the first call manager to which endpoint 118 successfully connects. In the illustrated embodiment, endpoint 118 connects to primary call manager 106 and secondary call manager 108 and registers with primary call manager 106. Registration may differ depending on the protocol of endpoint 118. If system 10 uses SCCP, endpoint 118 registers with primary call manager 106 with a MAC address. If system 10 uses SIP, the address-of-record of endpoint 118 is registered with primary call manager 106. System 10 routes calls to endpoint 118 using a routable uniform resource identifier, which handles calls for the address-of-record registered with primary call manager 106.

Once registered, a user may reset or restart endpoint 118. If endpoint 118 is restarted, database 102 sends the notification to TFTP server 112 and primary call manager 106. TFTP server 112 builds the configuration files. Primary call manager 106 forces endpoint 118 to re-read the configuration files from TFTP server 112. Endpoint 118 re-reads the configuration files and re-registers with primary call manager 106 with the new configuration files.

When registered with primary call manager 106, endpoint 118 sends keep-alive signals to primary call manager 106 and secondary call manager 108 to confirm operability. The keep-alive signals are register requests that continually get refreshed. A register request includes a header with an "expires" parameter. The "expires" parameter sets when the registration will be refreshed. A user may configure the "expires" parameter to achieve the desired performance. Endpoint 118 sends keep-alive signals to primary call manager 106 and secondary call manager 108 on a periodic basis as configured by a user. Primary call manager 106 and secondary call manager 108 acknowledge the keep-alive signals from endpoint 118 to confirm operability.

Endpoint 118 recognizes that primary call manager 106 fails and begins the failover process if primary call manager 106 does not acknowledge the keep-alive signals. The failover process includes endpoint 118 registering with secondary call manager 108 to manage the call sessions for endpoint 118 and connecting to tertiary call manager 110 as a backup. Secondary call manager 108 manages the call sessions for endpoint 118 until primary call manager 106 recovers from the failure. Endpoint 118 sends keep-alive signals to secondary call manager 108 and tertiary call manager 110 to confirm operability.

Primary call manager 106 may fail before endpoint 118 initially registers with primary call manager 106. Endpoint 118 monitors the recovery of primary call manager 106. Endpoint 118 uses secondary call manager 108, tertiary call manager 110, or SRST 116 to handle call sessions until primary call manager 106 recovers. Endpoint 118 may re-register with any higher level call manager that becomes operable after failing. For example, if endpoint 118 registers with tertiary call manager 110, endpoint 118 may re-register with secondary call manager 108 when secondary call manager 108 regains operability rather than waiting for primary call manager 106 to recover. When endpoint 118 determines that primary call manager 106 has recovered from failure and remained operable for a configurable period of time, endpoint 118 unregisters from secondary call manager 108, tertiary call manager 110, or SRST 116 and re-registers with primary call manager 106.

If secondary call manager 108 fails before primary call manager 106 recovers, endpoint 118 registers with tertiary call manager 110 and connects to another call manager as a backup or operates without a backup call manager. Tertiary call manager 110 manages call sessions for endpoint 118 until secondary call manager 108 or primary call manager 106 recovers. Endpoint 118 falls back to the call manager of the highest preference that is operational. When endpoint 118 begins the fall back process, it attempts to fall back to all operational call managers giving preference to primary call manager 106 should other call managers recover at similar times. If tertiary call manager 110 fails before primary call manager 106 or secondary call manager 108 recover, endpoint 118 registers with SRST router 116 to manage the call session.

An element of system 10 may include any suitable configuration of an interface, logic, and memory for performing the operations of the element. An interface refers to any suitable structure of a device operable to receive input for the device, send input from the device, or both, and may comprise one or more ports. Logic refers to any suitable hardware, software, or a combination of hardware and software. For example, logic may comprise a processor. A processor may refer to any suitable device operable to execute instructions and manipulate data to perform operations. Memory refers to any structure operable to store and facilitate retrieval of information used by a processor, and may comprise random access memory (RAM), read-only memory (ROM), magnetic drives, disk drives, compact disk (CD) drives, digital video disk (DVD) drives, removable dialog storage, any other suitable data storage device, or a combination of any of the preceding.

Modifications, additions, or omissions may be made to system 10 without departing from the scope of the invention. For example, primary call manager 106, secondary call manager 108, and tertiary call manager 110 may be connected to a network and endpoint 118 may be connected to that network.

Moreover, the operations of system 10 may be performed by more, fewer, or other modules. For example system 10 may have more than one endpoint 118 that is connected to call managers 106, 108, or 110. Furthermore, endpoints 118 may have any call manager as their primary call manager and any call manager as their secondary call manager. Endpoints 118 may share primary call managers and secondary call managers or may have different primary call managers and different secondary call managers. The components of system 10 may be integrated or separated according to particular needs. Additionally the operations of system 10 may be performed using any suitable logic comprising software, hardware, other logic, or any suitable combination of the preceding. As used in this document, "each" refers to each member of a set or each member of a subset of a set.

Figure 2:
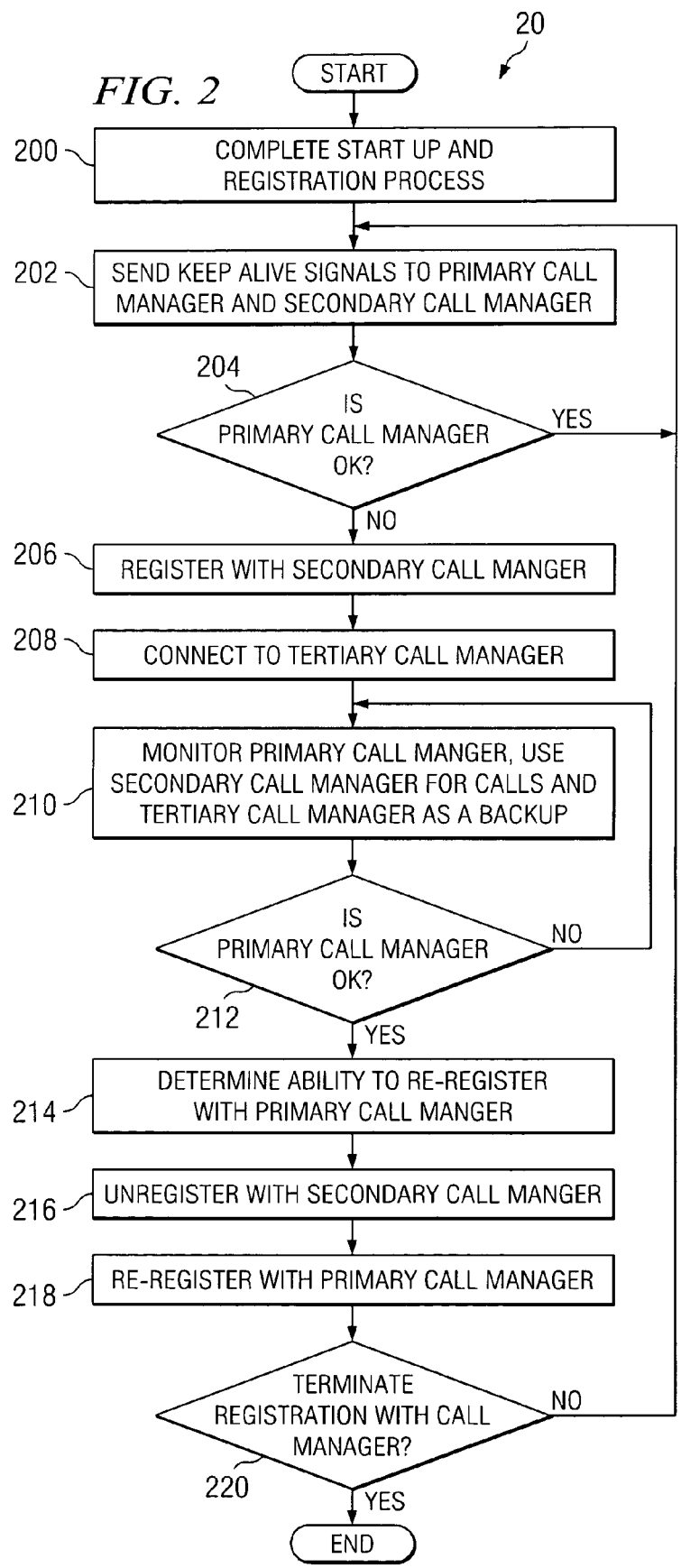
FIG. 2 is a flowchart showing one example of a method for registering with the call manager.

FIG. 2 is a flowchart 20 of a method for endpoint 118 registering with a call manager in system 10. Endpoint 118 completes the start up and registration process at step 200. The process includes connecting to primary call manager 106 and secondary call manager 108 and registering with primary call manager 106. At step 202, endpoint 118 sends keep-alive signals to primary call manager 106 and secondary call manager 108. At step 204, endpoint 118 determines whether primary call manager 106 remains operable. If primary call manager 106 is functional, endpoint 118 continues sending keep-alive signals to primary call manager 106 and secondary call manager 108.

If primary call manager 106 is not functional, endpoint 118 registers with secondary call manager 108 at step 206. At step 208, endpoint 118 connects to tertiary call manager 110. At step 210, endpoint 118 monitors the recovery of primary call manager 106 while using secondary call manager 108 for calls and tertiary call manager 110 as a back up call manager. Endpoint 118 determines whether primary call manager 106 has recovered from its failure at step 212. If primary call manager 106 has not recovered, endpoint 118 continues to monitor the progress of primary call manager 106 and use secondary call manager 108 for call sessions.

If primary call manager 106 has recovered from its failure, endpoint 118 determines its ability to re-register with primary call manager 106 at step 214. In addition to determining when endpoint 118 may re-register with primary call manager 106, endpoint 118 also determines whether it is re-registering with primary call manager 106 according to the current configuration of endpoint 118 or whether endpoint 118 should update the configuration files from TFTP server 112. If primary call manager 106 has the ability to re-register endpoint 118, endpoint 118 unregisters with secondary call manager 108 at step 216 and re-registers with primary call manager 106 at step 218. System 10 then determines whether endpoint 118 terminates the registration with primary call manager 106 at step 220. If endpoint 118 does not terminate the registration, endpoint 118 continues from step 202, sending keep-alive signals to primary call manager 106 and secondary call manager 108. If system 10 receives a request to terminate registration at step 220, the method ends.

The method described is only an example of registering with a call manager. Modifications, additions, or omissions may be made to the method without departing from the scope of the invention. The method may include more, fewer, or other steps. Additionally, steps may be performed in any suitable order without departing from the scope of the invention. For instance, system 10 may register with secondary call manager 108 before unregistering with primary call manager 106.

FIGS. 3 through 7 are call flow diagrams that illustrate examples of the operation of registering with a call manager. When endpoint 118 registers or re-registers with a call manager, endpoint 118 verifies it has the most current version of the configuration files. If endpoint 118 does not have the current configuration files, endpoint 118 updates the configuration files by downloading the current configuration files from TFTP server 112.

Figure 3:
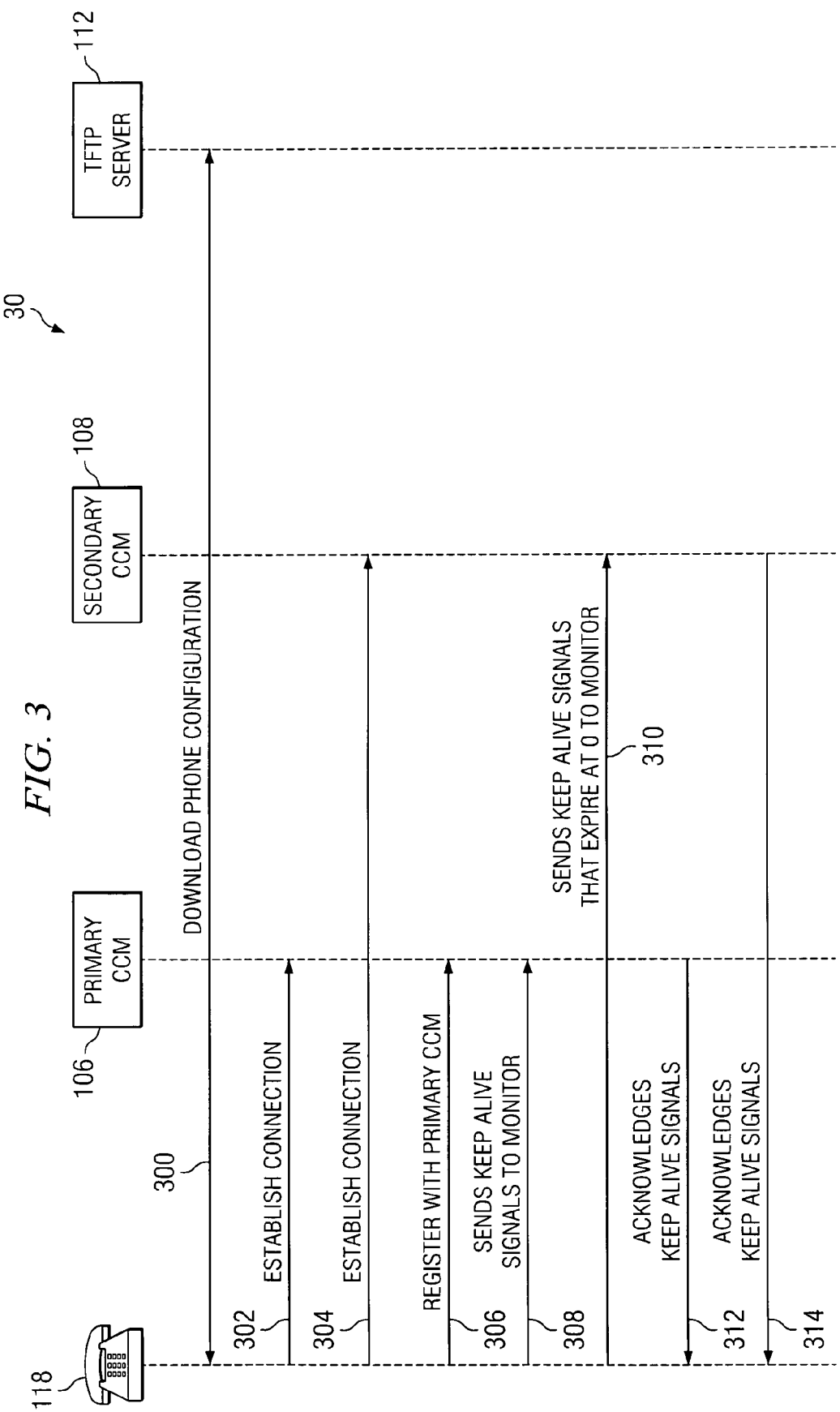
FIG. 3 is a call flow diagram for registering with a primary call manager.

FIG. 3 shows an example of a call flow diagram 30 of the initial start up and registration of endpoint 118. Endpoint 118 downloads the configuration files from TFTP server 112 at 300. Endpoint 118 establishes a connection to primary call manager 106 at 302 and establishes a connection to secondary call manager 108 at 304. Here, the connection to primary call manager 106 and secondary call manager 108 is a TLS connection. The TLS connection guarantees privacy and data integrity by endpoint 118 and call managers 106, 108. In another embodiment, the connection may be a TCP connection or a UDP connection. A TCP connection enables endpoint 118 and call managers 106, 108 to exchange information and guarantees the delivery of the information in the same order the information is sent. A UDP connection allows datagrams, data packets, to be sent over a network. Endpoint 118 registers with primary call manager 106 at 306.

Endpoint 118 sends keep-alive signals to primary call manager 106 at 308 to monitor operability and sends keep-alive signals to secondary call manager 108 at 310 to refresh registration and monitor operability. One line on endpoint 118, as selected by primary call manager 106, sends and receives keep-alive signals. The keep-alive signals sent to primary call manager 106 refresh the registration at a configurable interval. Endpoint 118 sends a registration request to primary call manager 106 with the "expires" parameter greater than zero. The keep-alive signals sent to secondary call manager 108 monitor the operability of secondary call manager 108. The "expires" parameter of the keep-alive signal is set to zero. Setting the "expires" parameter to zero minimally impacts secondary call manager 108 while continually monitoring secondary call manager 108. Primary call manager 106 and secondary call manager 108 acknowledge the keep-alive signals at 312 and 314, respectively as long as primary call manager 106 and secondary call manager 108 remain operational.

Endpoint 118 may not register with primary call manager 106 as illustrated. In another embodiment, if unable to register with primary call manager 106, endpoint 118 attempts to register with secondary call manager 108. Upon successfully registering to secondary call manager 108, endpoint 118 establishes a connection to tertiary call manager 110. Endpoint 118 sends keep-alive signals to secondary call manager 108 and tertiary call manager 110 to monitor operability. Additionally, endpoint 118 establishes a connection to primary call manager 106 and sends keep-alive signals to primary call manager 106 to monitor operability. If primary call manager 106 recovers, endpoint 118 unregisters from secondary call manager 108 while maintaining the connection with secondary call manager 108, drops the connection to tertiary call manager 110, and registers with primary call manager 106.

In yet another embodiment, secondary call manager 108 may fail while endpoint 118 is registered to primary call manager 106 and monitoring secondary call manager 108 as a backup call manager. If secondary call manager 108 does not acknowledge the keep-alive signals at 314, secondary call manager 108 has failed. Endpoint 118 connects to tertiary call manager 110. Endpoint 118 sends keep-alive signals to monitor the operability of tertiary call manager 110. While connected to tertiary call manager 110, endpoint 118 monitors the recovery of secondary call manager 108 and continues to use primary call manager 106 for call sessions. When secondary call manager 108 recovers and remains operable for a configured period of time, endpoint 118 drops the connection with tertiary call manager 110 and stops sending keep-alive signals to tertiary call manager 110. Endpoint 118 sends keep-alive signals to secondary call manager 108 to monitor operability.

Figure 4:
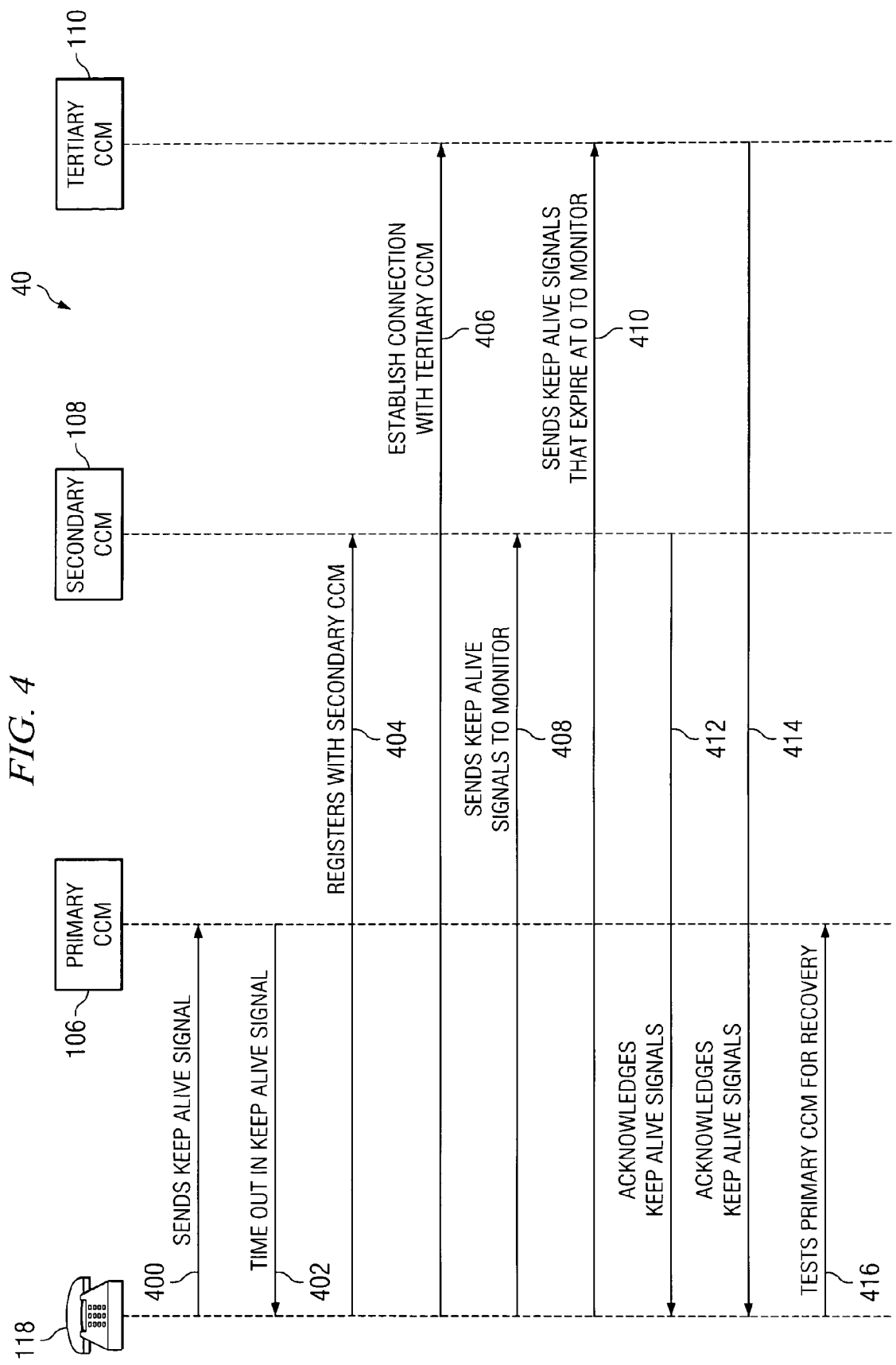
FIG. 4 is call flow diagram for failing over to a secondary call manager.

FIG. 4 shows an example of a call flow diagram 40 of primary call manager 106 failing and endpoint 118 registering with secondary call manager 108. Endpoint 118 sends keep-alive signals to primary call manager 106 at 400 to refresh registration and monitor operability. Primary call manager 106 fails and a time out in the keep-alive signals occurs at 402, which triggers the failover process that includes processes 404-416. Other failures may trigger the failover process, including: socket error events, retransmission failures, and network problems. If endpoint 118 has an active call when primary call manager 106 fails, the failover process does not begin until endpoint 118 becomes idle. While waiting to execute the failover process, endpoint 118 indicates the occurrence of the failure. According to the illustrated embodiment, endpoint 118 cannot initiate mid-call features if primary call manager 106 fails during mid-call. In an embodiment, endpoint 118 begins the failover process while endpoint 118 has an active call. In another embodiment, the failover process may begin during mid-call.

To begin the failover process, endpoint 118 registers with secondary call manager 108 at 404. Endpoint 118 verifies that endpoint 118 has the most current configuration version. If endpoint 118 does not have the current configuration version, endpoint 118 updates the configuration files by downloading the current configuration files from TFTP server 112. Endpoint 118 establishes a connection with tertiary call manager 110 at 406. Endpoint 118 sends keep-alive signals to secondary call manager 108 to refresh registration and monitor operability at 408. Endpoint 118 sends keep-alive signals to tertiary call manager 110 at 410 to monitor operability. The keep-alive signals sent to tertiary call manager 110 have an "expires" parameter set to zero. If operating correctly, secondary call manager 108 and tertiary call manager 110 acknowledge the keep-alive signals at 412 and 414, respectively. At 416, endpoint 118 tests primary call manager 106 for recovery. Endpoint 118 tests primary call manager 106 by sending registration requests with the "expires" parameter set to zero. When primary call manager 106 acknowledges the request, it has recovered from the failure.

Figure 5:
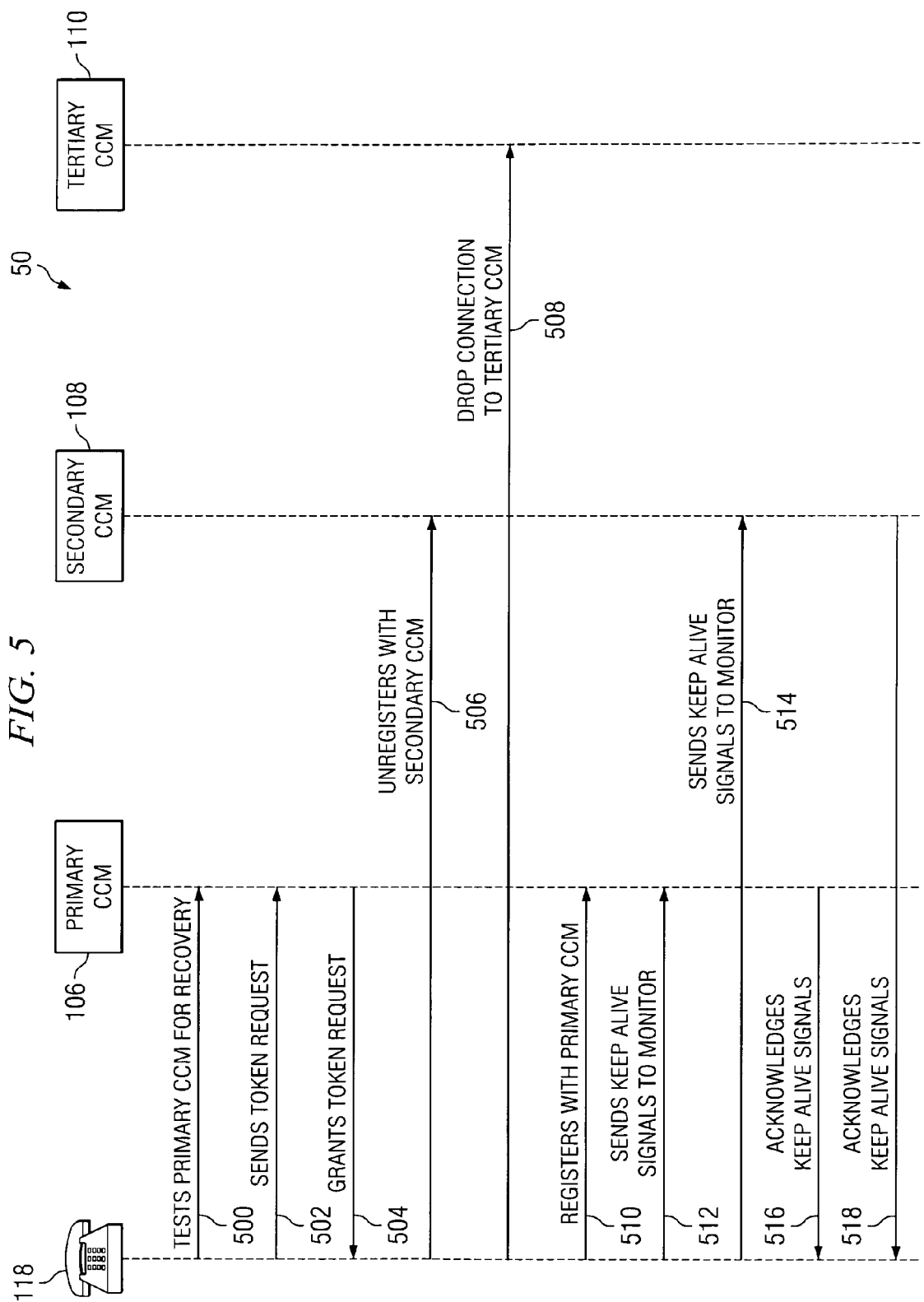
FIG. 5 is a call flow diagram of an example for falling back to the primary call manager.

FIG. 5 shows an example of a call flow diagram 50 of the fallback process after primary call manager 106 recovers. Endpoint 118 tests primary call manager 106 for recovery at 500 by sending registration requests. When primary call manager 106 acknowledges the requests and remains operable for a period of time as configured by the user, endpoint 118 begins the fallback process to primary call manager 106. In the illustrated embodiment, endpoint 118 sends a token request 502 to re-register with primary call manager 106. If primary call manager 106 has space in its queue to re-register endpoint 118, primary call manager 106 grants the token request 504. Upon the grant of the token request, endpoint 118 unregisters from secondary call manager 108 at 506 and drops the connection with tertiary call manager 110 at 508. In another embodiment, endpoint 118 may attempt to re-register with primary call manager 106 without sending a token request. Not sending a token request establishes a low-priority position on the queue for endpoint 118. Instead, endpoint 118 is placed on the back of the queue. To unregister with secondary call manager 108, endpoint 118 sends a register request with the "expires" parameter set to zero. When endpoint 118 unregisters from secondary call manager 108, endpoint 118 maintains the connection with secondary call manager 108.

Endpoint 118 re-registers with primary call manager 106 at 510. When re-registering with primary call manager 106, endpoint 118 verifies the configuration file and downloads the current version if necessary. Endpoint 118 sends keep-alive signals to primary call manager 106 to refresh registration and monitor operability at 512. Endpoint 118 sends keep-alive signals to secondary call manager 108 at 514 to monitor operability. Primary call manager 106 and secondary call manager 108 acknowledge the keep-alive signals at 516 and 518, respectively if the call managers remain operable.

Figure 6:
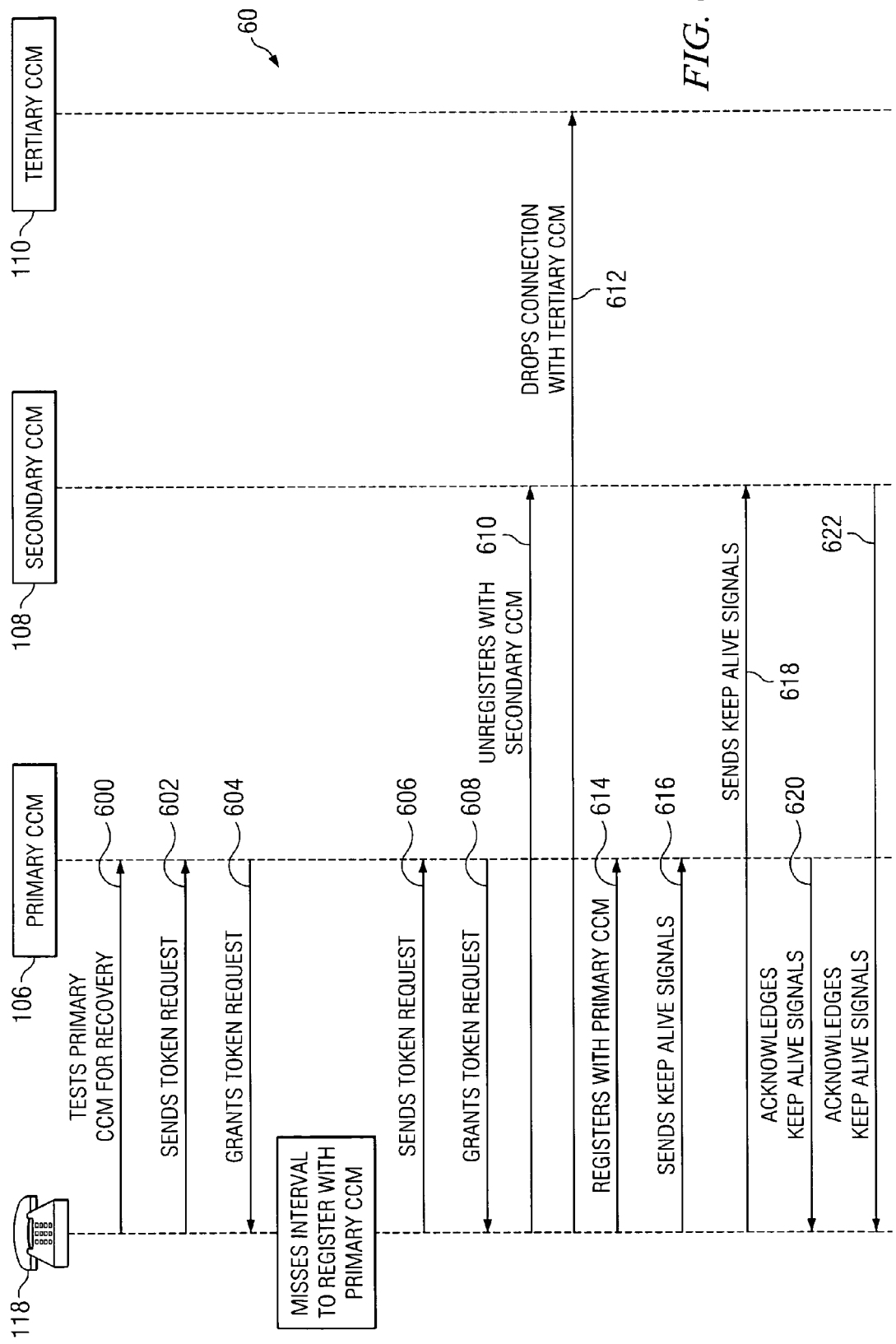
FIG. 6 is a call flow diagram of another example for falling back to the primary call manager.

FIG. 6 shows another example of a call flow diagram 60 where endpoint 118 falls back to primary call manager 106. Endpoint 118 tests primary call manager 106 at 600 for recovery by sending registration requests. When primary call manager 106 acknowledges the requests and remains operable for the period of time as configured by the user, endpoint 118 begins the fallback process to primary call manager 106. Endpoint 118 sends a token request 602 to primary call manager 106. If the queue of primary call manager 106 lacks space when endpoint 118 attempts to re-register, primary call manager 106 rejects the token request. In addition to rejecting the token request, primary call manager 106 sends a time estimate specifying when to retry the token request. In the illustrated embodiment, primary call manager 106 grants the token request at 604, but endpoint 118 misses the interval to register with primary call manager 106 and endpoint 118 resends the token request to establish a position on the queue at 606. Primary call manager 106 grants the token request at 608 if space is available in the queue. Endpoint 118 unregisters with secondary call manager 108 at 610 and drops the connection with tertiary call manager 110 at 612. Endpoint 118 re-registers with primary call manager at 614. When re-registering with primary call manager 106, endpoint 118 verifies the configuration file is the current version and downloads the current version from TFTP server 112 if necessary. Endpoint 118 sends keep-alive signals to primary call manager 106 to refresh registration and monitor operability at 616. Endpoint 118 sends keep-alive signals to secondary call manager 108 at 618 to monitor operability. Primary call manager 106 and secondary call manager 108 acknowledge the keep-alive signals at 620 and 622, respectively if the call managers remain operable.

Figure 7:
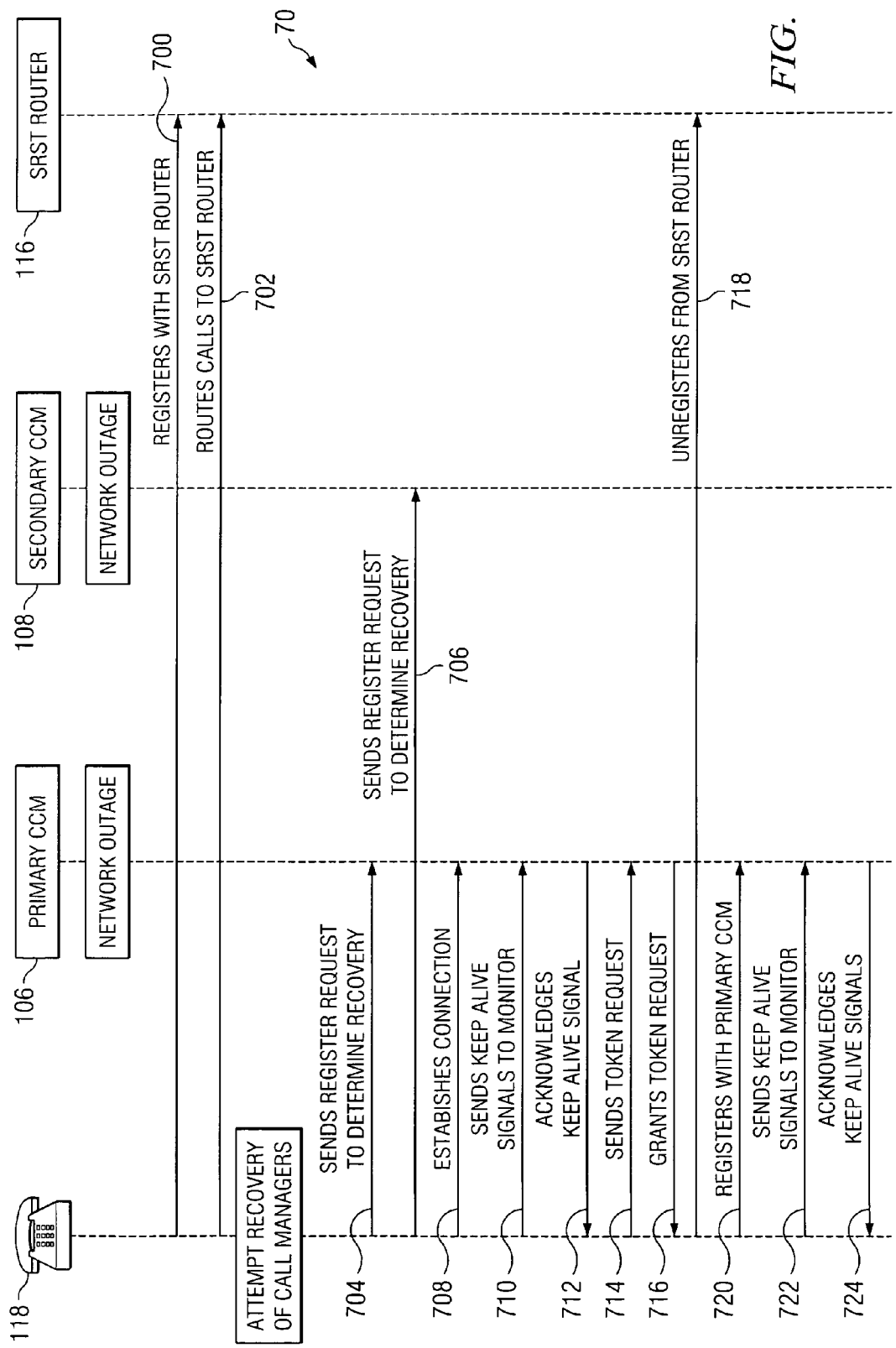
FIG. 7 is a call flow diagram for failing over to a survivable remote site telephony router and falling back to the primary call manager.

FIG. 7 is a call flow diagram 70 that depicts system 10 using SRST router 116 in the failover process. In the illustrated embodiment, primary call manager 106 and secondary call manager 108 fail because a network outage occurs. Upon detecting the outage, endpoint 118 begins to failover to SRST router 116 by registering with SRST router 116 at 700. A SCCP endpoint 118 sends a registration for each device to SRST router 116, while a SIP endpoint 118 sends a register message for each line to SRST router 116. In addition, endpoint 118 may failover to SRST router 116 if the plurality of call managers fails. A Media Gateway Control Protocol (MGCP) feature may detect a timeout in the keep-alive signals sent to the configured call managers to notify endpoint 118 to register with SRST router 116. While in failover, calls are routed to SRST router 116 at 702. Endpoint 118 sends register requests to primary call manager 106 at 704 and to secondary call manager 108 at 706 to determine recovery. Endpoint 118 continually sends the register requests at 704 and 706 until primary call manager 106 and secondary call manager 108 recover and acknowledge the signals.

While routing calls through SRST router 116, endpoint 118 monitors the recovery of the network or the plurality of call managers to begin the fall back process. When primary call manager 106 recovers, endpoint 118 establishes a connection with primary call manager 106 at 708 to test the operability of primary call manager 106. Endpoint 118 sends keep-alive signals 710 for a configurable period of time to verify the stability of the connection and the network. Primary call manager 106 acknowledges the keep-alive signals from endpoint 118 at 712. Upon determining that the connection to primary call manager 106 is stable, endpoint 118 sends a token request 714 to primary call manager 106 that requests re-registration. If primary call manager 106 has space in its queue to re-register endpoint 118, primary call manager 106 grants the token request at 716. Endpoint 118 now begins the fall back process to primary call manager 106. Endpoint 118 unregisters from SRST router 116 at 718. Endpoint 118 re-registers with primary call manager 106 at 720. When re-registering, endpoint 118 verifies the configuration files are current. If the files are not current, endpoint 118 downloads the current version from TFTP server 112. Endpoint 118 sends keep-alive signals to monitor the operability of primary call manager 106 and refresh registration at 722. Primary call manager 106 acknowledges the keep-alive signals at 724 while operable. If endpoint 118 has an active call using SRST router 116 when primary call manager 106 recovers, endpoint 118 continues to test primary call manager 106 until endpoint 118 is idle. Once endpoint 118 is idle, endpoint 118 falls back to primary call manager 106 as described above.

While this disclosure has been described in terms of certain embodiments and generally associated methods, alternations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A method for registering with a call manager, comprising:
   maintaining a plurality of call managers associated with a plurality of levels;
   maintaining a connection between a first endpoint and each of a first call manager and a second call manager;
   registering the endpoint with the first call manager;
   sending keep-alive signals from the endpoint to the first call manager;
   sending keep-alive signals from the endpoint to the second call manager while registered with the first call manager;
   when a failure is detected in the first call manager, registering the endpoint with the second call manager; and
   when a failure is detected in the second call manager, registering the endpoint with a third call manager;
   while registered with the third call manager, sending keep-alive signals from the endpoint to the first call manager and the second call manager to monitor the operability of the first call manager and the second call manager;
   initiating a fall back process to fall back to any call manager that becomes operational after failing and is at a higher level than the third call manager; and
   un-registering from the third call manager and re-registering the endpoint with the second call manager when the second call manager regains operability since the second call manager is at a higher level than the third call manager.

2. The method of claim 1, wherein initiating a failover process includes registering the endpoint with the second call manager, connecting the endpoint to the third call manager, sending keep-alive signals from the endpoint to the second call manager, and sending keep-alive signals from the endpoint to the third call manager while registered with the second call manager.

3. The method of claim 1, wherein sending keep-alive signals to the second call manager includes sending keep-alive signals with an expire header equal to zero.

4. The method of claim 1, further comprising:
   monitoring the connection between the endpoint and the first call manager;
   determining registration ability of the first call manager by sending a token request;
   receiving, by the endpoint, a response from the first call manager that includes information regarding registration ability.

5. The method of claim 4, wherein receiving a response that includes information regarding registration ability includes receiving a grant to register with the first call manager if a queue does not exceed a specified limit.

6. The method of claim 4, wherein receiving a response that includes information regarding registration ability includes receiving a denial to register with the first call manager if the queue equals or exceeds the specified limit with a time interval to retry the token request.

7. The method of claim 1, further comprising:
   maintaining a connection between the endpoint and the third call manager;
   sending keep-alive signals from the endpoint to the second call manager; and sending keep-alive signals from the endpoint to the third call manager while registered with the second call manager.

8. The method of claim 1, wherein the failure of the first call manager is detected during an active call, and wherein registering the endpoint with the second call manager occurs during the active call.

9. The method of claim 1, further comprising monitoring the second call manager for a pre-configured period of time to verify that the second call manager is operational for the pre-configured period of time before re-registering the endpoint with the second call manager when the second call manager regains operability.

10. A system for registering with a call manager, comprising:
a plurality of call managers operable to: register a plurality of endpoints, the plurality of call managers operable to manage a call session associated with the plurality of endpoints, each one of the plurality of call managers associated with a level selected from a plurality of levels;
the plurality of endpoints coupled to the plurality of call managers, the plurality of endpoints operable to register with a first call manager, the plurality of endpoints operable to maintain a connection with the first call manager and a second call manager, the plurality of endpoints operable to send keep-alive signals to the first call manager and operable to send keep-alive signals to the second call manager while registered with the first call manager, the plurality of endpoints operable to register with the second call manager when a failure is detected in the first call manager, the plurality of endpoints operable to register with a third call manager when a failure is detected in the second call manager, the plurality of endpoints operable to send keep-alive signals to the first call manager and the second call manager to monitor the operability of the first call manager and the second call manager while the endpoints are registered with the third call manager; the plurality of endpoints operable to initiate a fall back process to fall back to any call manager that becomes operational after failing and is at a higher level than the third call manager; and
one or more transfer protocol servers coupled to the plurality of endpoints, the transfer protocol servers operable to provide the plurality of endpoints with configuration information.

11. The system of claim 10, further comprising:
a Dynamic Host Configuration Protocol (DHCP) server coupled to the plurality of endpoints, the DHCP server operable to provide the plurality of endpoints with start up information.

12. The system of claim 10, further comprising:
an extension mobility server coupled to the plurality of endpoints, the extension mobility server operable to enable users to temporarily access endpoint configuration files from another endpoint;
a database coupled to the extension mobility server and the transfer protocol servers, the database operable to maintain endpoint configuration files, wherein the extension mobility server interacts with the database to apply new configurations associated with the plurality of endpoints;
a call manager administrator coupled to the database, the call manager administrator operable to provide information to the database.

13. The system of claim 10, wherein the plurality of endpoints are operable to register with the second call manager if a failover process begins, the plurality of endpoints operable to connect to the third call manager, the plurality of endpoints operable to send keep-alive signals to the second call manager and operable to send keep-alive signals to the third call manager while registered with the second call manager.

14. The system of claim 10, wherein the plurality of endpoints are operable to: monitor the connection to the first call manager to determine operability of the first call manager, the plurality of endpoints are operable to send a token request to the first call manager to determine registration ability of the first call manager.

15. The system of claim 14, wherein the first call manager is operable to grant a token request if a queue does not exceed a specified limit.

16. The system of claim 14, wherein the first call manager is operable to deny the token request if the queue equals or exceeds the specified limit with a time interval to retry the token request.

17. The system of claim 10, wherein the plurality of endpoints operable to maintain the connection with the third call manager, the plurality of endpoints operable to send keep-alive signals to the second call manager, and the plurality of endpoints operable to send keep-alive signals to the third call manager while registered with the second call manager.

18. The system of claim 10, further comprising:
a Survivable Remote Site Telephony (SRST) router coupled to the plurality of endpoints, the SRST operable to facilitate establishing the call session for the plurality of endpoints.

19. The system of claim 10, wherein the plurality of endpoints are operable to detect the failure of the first call manager during an active call, and wherein the plurality of endpoints are operable to register with the second call manager during the active call.

20. The system of claim 10, wherein the plurality of endpoints are operable to monitor the second call manager for a pre-configured period of time to verify that the second call manager is operational for the pre-configured period of time before re-registering with the second call manager when the first second call manager regains operability.

21. A system for registering with a call manager, comprising:
means for maintaining a plurality of call managers associated with a plurality of levels;
means for maintaining a connection between an endpoint and each of a first call manager and a second call manager;
means for registering the endpoint with the first call manager;
means for sending keep-alive signals from the endpoint to the first call manager;
means for sending keep-alive signals from the endpoint to the second call manager while registered with the first call manager;
means for registering the endpoint with the second call manager when a failure is detected in the first call manager;
means for registering the endpoint with a third call manager when a failure is detected in the second call manager;
means for sending keep-alive signals from the endpoint to the first call manager and the second call manager to monitor the operability of the first call manager and the second call manager while registered with the third call manager;
means for initiating a fall back process to fall back to any call manager that becomes operational after failing and is at a higher level than the third call manager; and means for un-registering from the third call manager and re-registering the endpoint with the second call manager when the second call manager regains operability since the second call manager is at a higher level than the third call manager.

22. The system of claim 21, wherein initiating a failover process includes registering the endpoint with the second call manager, connecting the endpoint to the third call manager, sending keep-alive signals from the endpoint to the second call manager, and sending keep-alive signals from the endpoint to the third call manager while registered with the second call manager.

23. The system of claim 21, wherein sending keep-alive signals from the endpoint to the second call manager includes sending keep-alive signals with an expire header equal to zero.

24. The system of claim 21, further comprising:
means for monitoring the connection between the endpoint and the first call manager;
means for determining registration ability of the first call manager by sending a token request;
means for receiving, by the endpoint, a response that includes information regarding registration ability.

25. The system of claim 24, wherein receiving a response that includes information regarding registration ability includes receiving a grant to register with the first call manager if a queue does not exceed a specified limit.

26. The system of claim 24, wherein receiving a response that includes information regarding registration ability includes receiving a denial to register with the first call manager if the queue equals or exceeds the specified limit with a time interval to retry the token request.

27. The system of claim 21, further comprising:
means for maintain a connection between an endpoint and with the third call manager;
means for sending keep-alive signals from the endpoint to the second call manager; and
means for sending keep-alive signals from the endpoint to the third call manager while registered with the second call manager.

28. The system of claim 21, wherein:
the means for detecting the failure of the first call manager comprises means for detecting the failure of the first call manager during an active call; and
the means for registering the endpoint with the second call manager comprises means for registering with the second call manager during the active call.

29. The system of claim 21, further comprising:
means for monitoring the second call manager for a pre-configured period of time to verify that the second call manager is operational for the pre-configured period of time before re-registering with the second call manager when the second call manager regains operability.

30. A non-transitory computer readable medium including logic for registering with a call manager, the logic operable to:
maintain a plurality of call managers associated with a plurality of levels;
maintaining a connection between an endpoint and each of a first call manager and a second call manager;
register the endpoint with the first call manager;
send keep-alive signals from the endpoint to the first call manager;
send keep-alive signals from the endpoint to the second call manager while registered with the first call manager;
when a failure is detected in the first call manager, register the endpoint with the second call manager; and
when a failure is detected in the second call manager, register the endpoint with a third call manager;
while registered with the third call manager, send keep-alive signals from the endpoint to the first call manager and the second call manager to monitor the operability of the first call manager and the second call manager;
initiate a fall back process to fall back to any call manager that becomes operational after failing and is at a higher level than the third call manager; and
un-register from the third call manager and re-register the endpoint with the second call manager when the second call manager regains operability since the second call manager is at a higher level than the third call manager.

31. The non-transitory computer readable medium of claim 30, wherein the logic is operable to:
monitor the connection between the endpoint and the first call manager;
determine registration ability of the first call manager by sending a token request;
receive, by the endpoint, a response that includes information regarding registration ability.

32. The non-transitory computer readable medium of claim 31, wherein receiving a response that includes information regarding registration ability includes receiving a grant to register with the first call manager if a queue does not exceed a specified limit.

33. The non-transitory computer readable medium of claim 31, wherein receiving a response that includes information regarding registration ability includes receiving a denial to register with the first call manager if the queue equals or exceeds the specified limit with a time interval to retry the token request.

34. The non-transitory computer readable medium of claim 30, wherein the logic is operable to:
maintain a connection between the endpoint and with the third call manager;
send keep-alive signals from the endpoint to the second call manager; and
send keep-alive signals from the endpoint to the third call manager while registered with the second call manager.

35. The non-transitory computer readable medium of claim 30, further operable to:
detect the failure of the first call manager during an active call; and register the endpoint with the second call manager during the active call.

36. The non-transitory computer readable medium of claim 30, further operable to:
monitor the second call manager for a pre-configured period of time to verify that the second call manager is operational for the pre-configured period of time before re-registering with the second call manager when the second call manager regains operability.

* * * * *